Jan. 24, 1956 R. D. HOLT 2,731,767
TOY AIRCRAFT AND LAUNCHING DEVICE THEREFOR
Filed Sept. 24, 1951 3 Sheets-Sheet 1

INVENTOR.
RALPH D. HOLT
BY
Charles S. Penfold
ATTORNEY

Jan. 24, 1956 R. D. HOLT 2,731,767
TOY AIRCRAFT AND LAUNCHING DEVICE THEREFOR
Filed Sept. 24, 1951 3 Sheets-Sheet 2

INVENTOR.
RALPH D. HOLT
BY
Charles S. Perfold
ATTORNEY

Jan. 24, 1956   R. D. HOLT   2,731,767
TOY AIRCRAFT AND LAUNCHING DEVICE THEREFOR
Filed Sept. 24, 1951   3 Sheets-Sheet 3

INVENTOR.
RALPH D. HOLT
BY
Charles S. Penfold
ATTORNEY

United States Patent Office 2,731,767
Patented Jan. 24, 1956

2,731,767

TOY AIRCRAFT AND LAUNCHING DEVICE THEREFOR

Ralph D. Holt, Canton, Ohio

Application September 24, 1951, Serial No. 247,952

7 Claims. (Cl. 46—75)

This invention relates generally to amusement devices and more particularly has to do with means for launching toy aircraft such as a helicopter.

One of the principal objects of the invention is to provide a launching device embodying improved principles of design and construction including manually operable locking means whereby an aircraft can be held on the device and then released after its propeller has attained a speed sufficient to initiate flight.

An important object of the invention is to provide a launching device having a casing which serves as a housing for a power unit in the form of an electric motor for driving a propeller and as a launching platform for an aircraft.

Another object of the invention is to provide the platform with an opening through which the power unit and propeller shaft can be operatively connected, including means extending upwardly from the platform for holding an aircraft while the propeller of such craft is being rotated.

A significant object of the invention is to provide a setup whereby the locking means above referred to will automatically lock the helicopter on the platform when properly located thereon. With such an arrangement it is not necessary to manually adjust the locking means before the propeller shaft can be coupled with the power unit.

Also, an object of the invention is to provide a setup in which the driving connection between the propeller shaft and power unit is arranged in the casing for safety, and the inner end of such shaft is adapted for entry through the opening to act as the primary means for positioning the aircraft on the platform.

Another object of the invention is to provide a launching device having an electric motor for driving the propeller shaft of an aircraft and means such as a rheostat for varying the speed of the motor.

An additional object of the invention is to locate the locking means and the means for varying the speed of the motor in predetermined positions for convenient manipulation.

A further object of the invention is to provide a toy helicopter embodying improved principles of design and construction, and which includes a propeller shaft of sufficient length to extend transversely through the fuselage of the helicopter with its lower end exposed so that it may be inserted into the opening of the platform.

Also, an object of the invention is to provide a platform with a launching table that may be tilted and/or rotated so that a helicopter can be made to travel in the direction of the tilt. This novel movement of the launching table is preferably accomplished by providing the platform with a circular bearing and the table with a bearing that is normally held in operative engagement with the platform bearing by means of a spring. This spring serves to hold the table assembled with the platform and also produces sufficient friction between the bearings that the table will be automatically held in place after it has been manually adjusted to any one of an infinite number of positions.

Another object of the invention is to provide the platform and the movable launching table with means whereby to prevent tilting of the table rearwardly so that the helicopter will not fly backwards and perhaps injure an operator.

A still further object of the invention is to provide a launching device which is safe for children to operate, one which is durable and efficient in operation, and means whereby the altitude and duration of flight of an aircraft can be controlled as desired.

Other objects and advantages of the invention will be realized after the description hereinafter set forth is considered in connection with the drawings constituting a part of the subject specification.

In the drawings,

Figures 1 through 4 illustrate one embodiment of the invention as utilized in conjunction with a novel helicopter.

Figure 1 is a top view of a launching device for a helicopter;

Figure 2 is a longitudinal section of the launching device with a helicopter seated on the device;

Figure 3 is a bottom view of the launching device;

Figure 4 is a transverse section of the launching device;

Figures 5 and 6 are partial sectional views of a second embodiment of the invention illustrating another novel way of locking the helicopter on a launching platform;

Figure 7 is a top view of the launching device; and

Figure 8 is a longitudinal sectional view of Figure 7 showing details of construction.

Figure 1:
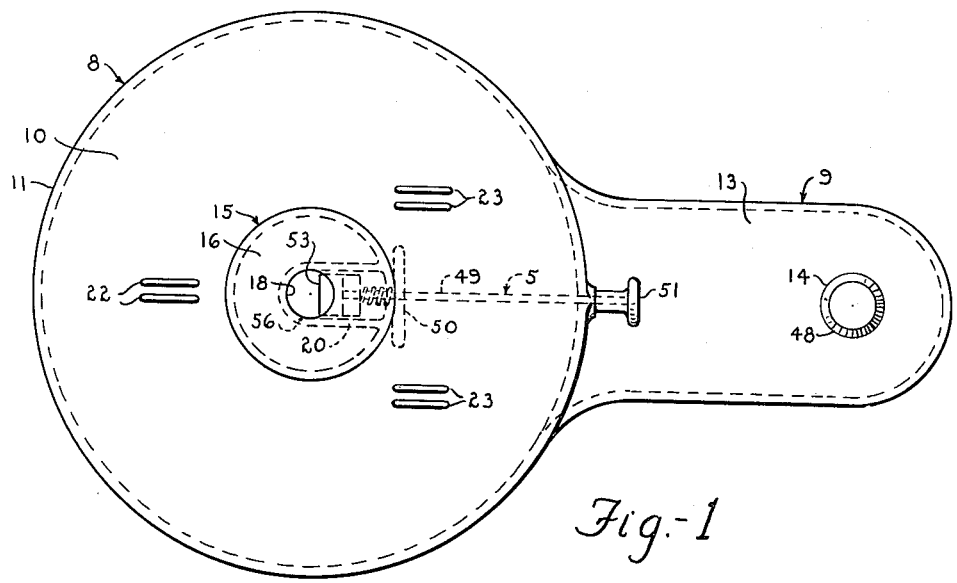

This application is a continuation-in-part of my copending application Serial Number 180,639, filed August 21, 1950.

The launching device for the helicopter includes, among other things, a casing generally designated 1, a motor unit 2, arranged in the casing for driving the propeller shaft 3 of a helicopter 4, and a locking means 5 for holding the shaft coupled with the drive shaft 6 of the motor until the propeller 7 has attained a speed sufficient to initiate flight of the helicopter.

The casing 1 may be made of any material suitable for the purpose, such as moulded plastic, and may be designed and constructed as desired, but as herein illustrated, preferably includes an enlarged round section 8 and an integral radial section 9. The round section 8 includes a top horizontal wall 10 and a round side wall 11 which merges with parallel side walls 12 and horizontal top wall 13 of the radial section to impart rigidity and a pleasing design to the casing. The round section 8 houses and supports the motor unit 2 and dry cells and its top wall serves as a launching platform. The radial section 9 may serve as a handle for carrying the launching device and for manipulating the device on a support such as a floor. The top wall 13 of the radial section is preferably disposed on a level somewhat below the level of the platform for clearance purposes and supports a rheostat 14 for varying the speed of the motor. The casing is open at its bottom to permit easy access to the motor unit and associated parts.

The launching platform is provided with a raised hollow annular central section 15 having a top wall 16 and a round side wall 17. The top wall is provided with an opening 18 which receives the lower end of the propeller shaft 3 and a bearing 19 therefor on the helicopter. The top wall and side wall may be reinforced by a generally U-shaped formation 20 which serves as a guide for the bearing 19 and the upper portion of a reciprocating latch 21 constituting a component of the locking means 5. The platform is provided with a pair of upstanding parallel guide portions 22 located generally on the medial line of the casing and forwardly of the central section 15 and also with a pair of similar guide portions 23 on either side of the medial line and rearwardly of the central section. The guide portions are all arranged parallel with respect to the longitudinal axis of the casing and in a generally triangular relationship with respect to the central section 15 for receiving three wheels 24 of the landing gear on the helicopter in a manner to prevent the helicopter from rotating on the platform while the propeller shaft 3 is being operated by the motor. The landing gear more or less straddles the central section 15 so the latter in some measure assists in locating the helicopter in position on the platform.

Figure 2:
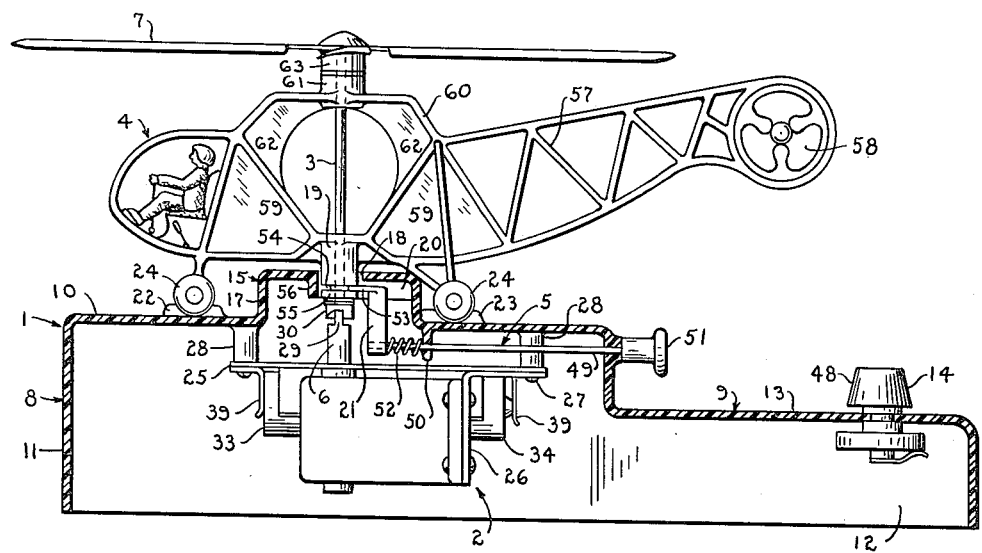

The motor 2 is secured to a mounting plate 25 by a bracket 26, the latter being detachably connected by screws 27 to four supports 28 integral with and depending from the platform. The motor is anchored to the platform so that its shaft 6 will extend through the plate and assume a vertical position in axial alignment with the opening 18 and so that its upper end will be more or less located in the central section 15. The upper end of the drive shaft is preferably provided with a key 29 in the form of a tenon which is adapted to fit into a recess therefor provided in a fitting 30 secured to the lower end of the propeller shaft 3 as shown in Figure 2. The recess is preferably formed with sufficient clearance to permit the propeller shaft 3 to readily disengage the drive shaft.

The mounting plate 25 is preferably made of insulating material and carries a pair of corresponding elongated spring clips 31 and 32. Each clip detachably holds a pair of batteries 33 and 34. Contact means 35 and 36 are secured to the mounting plate adjacent the opposite extremities of the clip 31 and contact means 37 and 38 adjacent the opposite extremities of clip 32. Each contact means includes a yieldable portion 39 for engaging a battery terminal.

The electrical hook-up between the motor, batteries and rheostat is relatively simple. As illustrated in Figure 3 a conductor 40 connects terminal 41 on the motor with contact means 35 and a conductor 42 connects the contact means 36 with contact means 37. The contact means 38 is connected to a stationary resistance coil 43 of the rheostat by a conductor 44 and a conductor 45 connects the other terminal 46 on the motor with a rotatable yieldable contact arm 47 constituting a component of the rheostat. The resistance coil is, of course, suitably insulated. It will be noted that conductors 44 and 45 extend into the radial section 9 of the casing. The contact arm 47 is carried by a knurled knob 48 for rotating the arm relative to the resistance coil 43. When the arm is in the dotted line position illustrated in Figure 3 the motor is inoperative because there is no electrical connection between conductors 44 and 45. However, as the arm is rotated by the knob in a clockwise direction as viewed in Figure 3 the resistance will gradually decrease and thereby gradually increase the speed of the motor. Thus, by manipulating the knob, one may readily increase or decrease the speed of the motor as desired.

The locking means 5, above referred to, includes a reciprocable rod 49 which extends through that portion of the side wall 11 of the round section 8 above the top wall 13 of the radial section 9 and also through a supporting lug 50 depending from the platform. The latch 21 is carried by the inner end of the rod and, as stated above, is guided by the side walls of the formation 20. A knob 51 is carried by the outer end of the rod and a helical spring 52 surrounds the rod and is interposed between the lug and latch for normally urging the rod inwardly and so that the knob will engage the section 8 to locate the latch in the position illustrated. The latch includes an offset forwardly extending locking portion 53 which is adapted to project into an annular groove 54 formed in the lower end of the bearing 19 on the helicopter. This bearing may be provided with a portion 55 which is of a diameter slightly less than the distance between the side walls of the formation 20. The formation also includes an arcuate end wall 56 which in combination with the side walls receive and assist in locating the portion 55 as shown in Figure 2.

The helicopter 4 is preferably made of moulded plastic and so designed and constructed that it is relatively light in weight and properly balanced aerodynamically. It is formed to more or less simulate a conventional helicopter and includes an elongated fuselage, the fore extremity of which carries a pilot. The rear extremity of the fuselage is generally of open framework construction as indicated at 57 to reduce the weight and the tail is provided with a formation 58 simulating a propeller. The intermediate body portion of the fuselage is made substantial and is reinforced by rigid panels 59 which impart rigidity to the landing gear and in some measure support the bearing 19. The body portion includes an elevated section 60 provided wtih an upper bearing 61 for the propeller shaft 3. The axially spaced bearings 19 and 61 provide the sole means of support for the shaft 3 and consequently the friction is reduced to a minimum. The elevated section 60 and bearing 61 are reinforced by panels 62. With this arrangement the hub 63 of the propeller 7 will rest on the bearing 61 and locate the propeller for rotation above the fuselage. The hub 63 and propeller are preferably designed and constructed to produce a flywheel effect to prolong the rotation of the propeller.

To operate the toy is a simple matter. This is accomplished by retracting the latch 21 by grasping the handle 51 and pulling out on the rod 49. The helicopter is then located on the platform of the launching device as illustrated in Figure 2, with the bearing 19 in the opening 18 and so that the recess in fitting 30 on the propeller shaft receives the key 29 on the drive shaft 6 of the motor, after which the latch 21 is released to place its locking portion 53 in the groove 54 of bearing 19 to lock the helicopter in its proper position for launching on the platform. The rheostat 14 may then be turned to control the flow of current from the batteries to the motor. When the rheostat is operated so that the motor shaft, propeller shaft and propeller 7 attain a predetermined speed, the latch 21 can be manipulated to release its holding portion 53 from the groove in the bearing 19, whereupon the helicopter will take off in flight from the platform. The motor is then stopped by turning the rheostat in the appropriate direction. The arrangement is preferably such that one may readily increase or decrease the speed of the motor shaft and propeller shaft and thereby permit gunning of the motor in a manner similar to that permitted in a standard or conventional helicopter now in use. Accordingly, the altitude and duration of the flight of an aircraft can be governed by the rheostat.

Figures 5 and 6 of the drawing illustrate another form of locking mechanism that may be employed for detachably holding a helicopter on a platform. In this embodiment a support 21a carried by a manually operable rod is provided with a pair of corresponding flexible locking fingers 53a and a bearing 19a for the propeller shaft is provided with a conical cam portion 55a. The structural relationship between the locking fingers 53a and the portion 55a is such that when the propeller shaft is inserted for coupling with the shaft of the power unit, the portion 55a will cause the fingers to spread apart and when such coupling has been effected the fingers will automatically snap into the groove provided therefor in the bearing, and thereby lock the helicopter in place. The helicopter can be readily released by merely manipulating the rod to withdraw the fingers from the groove. With this arrangement it is not necessary to manually operate the locking mechanism before inserting the propeller shaft into the opening of the launching platform. It is, of course, to be understood that the propeller shaft in some instances will have to be turned by hand in order to line up the recess in its fitting with the key on the motor shaft.

Figure 7:
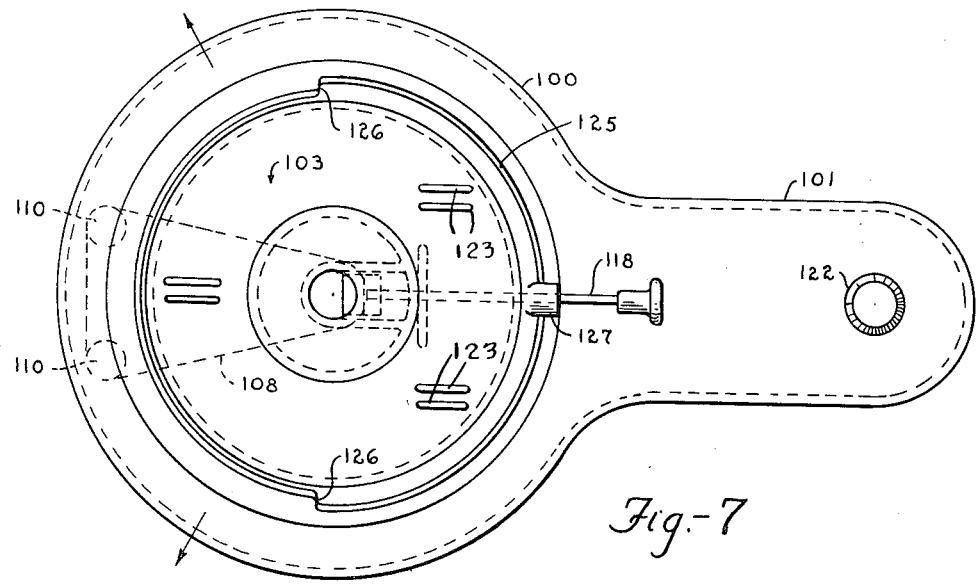
Figures 7 and 8 are directed to a third embodiment of the invention showing a unique way of constructing a tiltable launching device for a helicopter.
Figure 8:
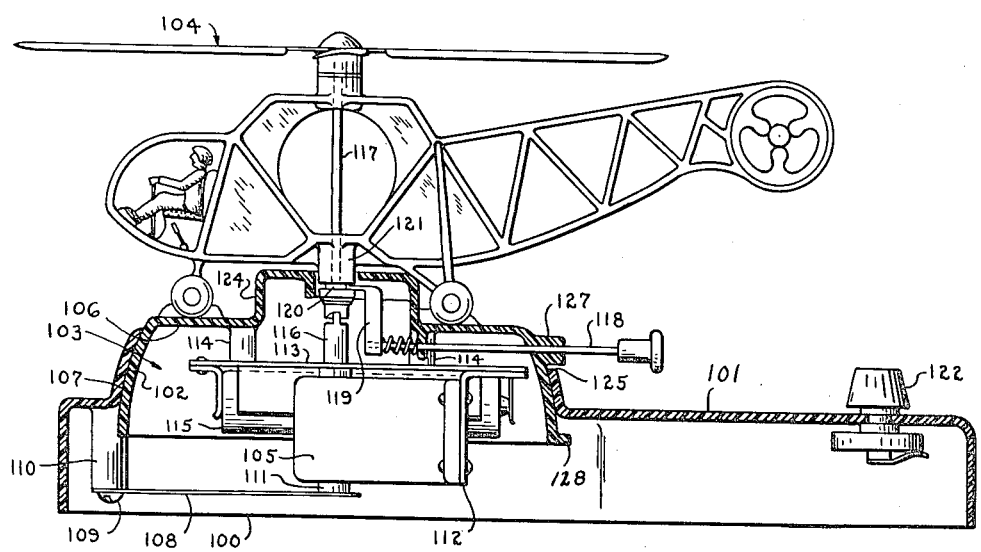

The third embodiment of the invention directed to a movable launching table for a helicopter and exemplified in Figures 7 and 8 of the drawing will now be described. The platform of this embodiment resembles the launching platform above referred to, and includes a round section 100 and a radial section 101. The round section is provided with an upstanding circular socket having an internal concave bearing surface or abutment 102. It will be noted that the upstanding socket is of a diameter somewhat less than the diameter of the round section 100.

A round table generally designated 103 provides a launching base for a helicopter 104. The table 103 may be made of any material suitable for the purpose, such as moulded plastic, and is preferably constructed in the form of an inverted cup to form a housing and a support for a motor 105. The table includes a top wall 106 and a curved side wall provided with an external convex bearing surface 107 which is normally held against the internal bearing surface 102 on the platform by resilient means in the form of a spring tongue 108. The spring tongue is generally triangular in shape and its base end is anchored by screws 109 to the lower ends of lugs 110 depending from the top wall of the round section 100. The free end of the spring bears against a circular boss 111 provided on the motor unit for resiliently engaging and maintaining the table 103 in nested relationship with the socket part of the round section 100.

The motor unit 105 may be mounted in any manner desired but as herein shown is mounted on a bracket 112 carried by a plate 113. The plate 113 is detachably suspended in a horizontal position on the lower ends of a plurality of lugs such as 114 depending from the top wall 106 of the table 103 as shown in Figure 8. A battery 115, including others not shown, may be carried by the plate 113 in a manner corresponding to that depicted in Figures 2 and 3 of the first embodiment. The motor is provided with a vertical drive shaft 116 which extends upwardly through the plate 113 for detachable connection with a propeller shaft 117 of the helicopter in the same manner as the first embodiment of the invention. A manually operable control rod 118 is used to release a locking element 119 from an annular groove 120 provided in bearing 121 formed on the helicopter for the shaft 117. A rheostat 122, connected in circuit with the batteries and motor, is utilized to control the operation of the motor. The top wall 106 of the table 103 is provided with three pairs of guides 123, similar to guides 22, arranged triangularly about a hollow annular section 124 upstanding from the top wall 106 of the table and constituting an integral part thereof.

As stated above, one of the important objects of the invention is to provide an improved construction whereby the launching base or table 103 for aircraft may be rotated and/or tilted. These movements may be obtained in various ways but as herein shown in Figure 7 they are accomplished by forming the bearing 102 on the socket portion of the round section 100 and the bearing 107 on the table 103 and by providing the upper edge of the socket portion of section 100 with a notch 125 which extends circumferentially slightly more than half way around the socket, the ends of the notch forming stops 126 for a tubular bearing 127 on the table 103 for the control rod 118.

In view of the foregoing description it will be manifest that the table 103 carrying the helicopter can be readily rotated horizontally by merely grasping the knob on the control rod 118 and swinging the table either clockwise or counterclockwise from the neutral position shown. The table may also be tilted or inclined forwardly by merely lifting up on the control lever. Forward tilting of the table is preferably limited by means of a flange 128 integral with and extending rearwardly from the lower marginal edge of the table for engaging the underside of the top wall of radial housing section 101 of the launching platform. With this unique arrangement the table can be rotated and/or tilted as desired. If rotated and tilted, for example, in the direction of either of the arrows shown in Figure 7 the helicopter, when released with the propeller rotating at high speed, will travel in the direction of the tilt. It will be noted that the drive shaft 116 of the motor and boss 111 are centrally located for balance and so that the pressure exerted by the spring 108 will be more or less evenly distributed between the bearing surfaces 102 and 107 to create sufficient frictional resistance to automatically retain the table 103 in any position to which it may be manually adjusted. The fact that the free end of the spring and the lower end of the boss 111 are planar in character tends to cause the table to assume the horizontal position shown. Also, assisting in this respect is the weight of the motor, the major part of which is located between the drive shaft 116 and the rear part of the table.

Attention is directed to the fact that the table cannot be tilted in a reverse direction because the base of the notch 125 forms a stop for the rod bearing 127. The base of the notch also in effect provides a track on which the bearing 127 may ride while the table is being rotated. Limiting downward movement of the rear part of the table is important as it will prevent the helicopter when released from sailing rearwardly and perhaps injuring an operator of the launching device.

In view of the foregoing description it will be manifest that I have provided toys that embody improved principles of design and construction and that although such description has been given in detail, it is not the intention to thereby restrict the scope of the invention beyond that defined by the appended claims, since the inventive principles thereof are capable of assuming other physical embodiments than those hereinbefore described.

I claim:

1. A toy launching device for a vehicle comprising a support, a tiltable platform mounted on the support, driving means carried by the platform and having a part for engaging and rotating a propeller shaft and propeller carried by a vehicle, locking means mounted on the platform whereby a vehicle may be held in relation to the platform until the propeller shaft and propeller on the vehicle has attained a predetermined speed, and said device having a single manual control operatively connected to the platform and to the locking means for control thereof.

2. In combination: a launching device and a vehicle, said launching device comprising a hollow body provided with a top wall movable angularly with respect to said body, said top wall having a raised portion with an opening therein, a power unit supported within the body and having a drive shaft axially aligned with the opening in said raised portion, a vehicle mounted on the top wall of the body, a bearing on the vehicle extending through the opening and disposed in the raised portion, a shaft rotatably mounted in said bearing and provided with a propeller at its outer end and cooperating means at its inner end keyed to the drive shaft, abutment means provided on the bearing, a manual control having a latch detachably connected to the abutment means for holding the cooperating means on the propeller shaft keyed to the drive shaft, and means operatively connected with the power unit for controlling the operation and speed of the drive shaft.

3. A toy launching device for a vehicle comprising a support, a platform mounted for movement on the support, driving means having a part for engaging and rotating a propeller shaft carried by a vehicle, locking means mounted on the platform whereby a vehicle may be held in relation to the platform until the propeller shaft has attained a predetermined speed, and said device having a single manual control operatively connected to the platform and to the locking means for control thereof.

4. A toy launching device for a vehicle comprising a support having bearing means, a platform having bearing means, means for holding the bearing means in relation to one another so that the platform can be rotated and/or tilted with respect to the support, a motor adapted for connection with a source of power, said motor having a part for engaging and rotating a propeller shaft carried by a vehicle, means for controlling the operation of the motor, locking means whereby a vehicle may be held in relation to the platform until the propeller shaft has attained a predetermined speed, and said device having a single manual control operatively connected to the platform and to the locking means for control thereof.

5. In combination: a launching device and a vehicle, said launching device comprising a hollow body provided with a top wall movable with respect to said body, said top wall having a raised portion with an opening therein, driving means in the body and having a drive shaft disposed axially of the opening, a vehicle mounted on the top wall of the body, a bearing on the vehicle axially aligned with the opening, a shaft rotatably mounted in said bearing and provided with a propeller at its outer end and cooperating means at its inner end keyed to the drive shaft, abutment means provided on the vehicle, a manual control for effecting movement of the top wall and having a latch detachably connected to the abutment means for holding the cooperating means on the propeller shaft keyed to the drive shaft, and means operatively connected with the driving means for controlling its operation.

6. In combination: a launching device and a vehicle, said launching device comprising a one-piece shell formed to provide a casing having a top wall and a radial section extending from the casing, said top wall being provided with an opening, a power unit in the shell and having a drive shaft disposed axially of the opening, a vehicle mounted on the top wall of the casing, a bearing on the vehicle, a shaft rotatably mounted in said bearing and provided with a propeller at its outer end and cooperating means at its inner end keyed to the drive shaft, abutment means provided on the vehicle, a manual control having a latch detachably connected to the abutment means for holding the vehicle on the top wall and the cooperating means on the propeller shaft keyed to the drive shaft, and means carried by the radial section operatively connected with the power unit for controlling the operation and speed of the drive shaft.

7. In combination: a launching device and a vehicle, said launching device comprising a hollow body provided with a top wall having a raised portion with an opening therein, a power unit supported within the body and having a drive shaft disposed axially of the opening, a vehicle mounted on the top wall of the body, a bearing on the vehicle, a shaft rotatably mounted in said bearing and provided with a propeller at its outer end and cooperating means at its inner end keyed to the drive shaft, a projection on the vehicle disposed in the opening for aligning the propeller shaft with the drive shaft, abutment means provided on the projection, a manual control having a latch detachably connected to the abutment means for holding the cooperating means on the propeller shaft keyed to the drive shaft, and means operatively connected with the power unit for controlling the operation and speed of the drive shaft.

References Cited in the file of this patent

UNITED STATES PATENTS

| 984,683 | Luce | Feb. 21, 1911 |
| 1,295,537 | Lorentzen | Feb. 25, 1919 |
| 1,457,063 | Hosch | May 29, 1923 |
| 1,708,999 | Bernier et al. | Apr. 16, 1929 |
| 2,352,806 | Schwartz | July 4, 1944 |
| 2,499,666 | Mikolajczyk | Mar. 7, 1950 |
| 2,687,267 | Copenhaver | Aug. 24, 1954 |

FOREIGN PATENTS

| 589,369 | Germany | Dec. 9, 1933 |
| 650,744 | Germany | Sept. 30, 1937 |
| 621,266 | Great Britain | Apr. 6, 1949 |